March 11, 1958     L. PARKIN     2,825,948
SHEET METAL FASTENING DEVICE
Filed Jan. 20, 1954
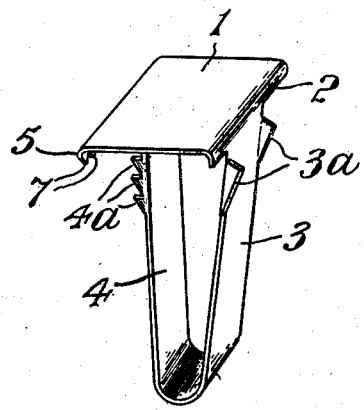
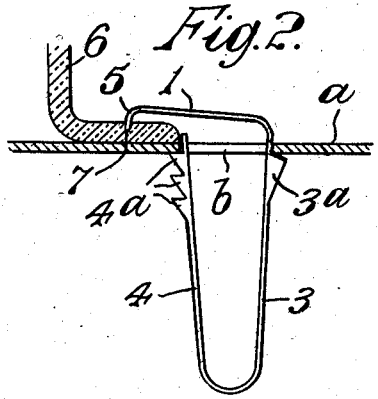
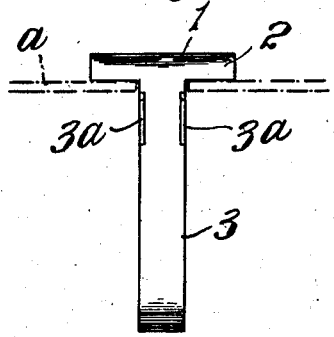
INVENTOR:
LESLIE PARKIN,
By Philip E. Parker
ATTORNEY.

United States Patent Office 2,825,948
Patented Mar. 11, 1958

2,825,948
SHEET METAL FASTENING DEVICE

Leslie Parkin, Hyson Green, England, assignor to United Carr Fastener Corporation, Cambridge, Mass., a corporation of Delaware Application January 20, 1954, Serial No. 405,211

Claims priority, application Great Britain January 21, 1953

1 Claim. (Cl. 24—73)

This invention relates to fastening devices for attaching a member to an apertured support and it is an object of the invention to provide improved means whereby the fastener can be readily assembled and secured to the support to clamp a member thereto.

According to the present invention a fastener device for attaching a member to an apertured support comprises a headed portion provided with a pair of relatively movable depending legs adapted to be inserted into the aperture in the support, the head portion having means for clamping a member to one face of the support, and at least one of the legs being formed with a sires of outwardly projecting lugs or the like for snapping engagement with a portion of the opposite face of the support adjacent to the edge of said aperture.

The legs may be formed by a U-shaped extension depending from the head, one of the sides of the U being integral with the head and the end of the other side being free and extending to a position adjacent to the underface of the head, a series of projecting lugs being formed adjacent to the free end of said second mentioned side.

To enable the invention to be fully understood it will now be described with reference to the accompanying drawing, in which:

Fig. 1 is a perspective view of a fastener device according to one embodiment of the invention;

Fig. 2 is a side view showing a fastener device assembled with an apertured support; and Fig. 3 is an end view thereof.

As shown in the accompanying drawing the fastener device is made of sheet metal and comprises a flat plate like head portion 1 adapted to extend in a plane substantially parallel to the plane of the support *a* with which it is to be assembled.

One edge of the head is formed with a flange 2 from which depends an extension bent into the form of a U and comprising a leg 3 integral with the flange 2 and a leg 4 the free end of which extends adjacent to but spaced from the underface of the head 1. The legs 3 and 4 are resilient so that they are movable relatively to one another to permit the insertion through the aperture in the support *a*.

The leg 3 is provided with an outwardly projecting lug 3*a* at each side edge spaced a short distance from the head 1 and the free end of the leg 4 is formed with a series of three outwardly projecting lugs or teeth 4*a* at each side edge.

In use the U-shaped attaching portion comprising the legs 3 and 4, is entered into the aperture *b* and pressure is applied to the head to force the legs through the aperture, the legs flexing relatively inwards to permit their passage. In final assembled position the lugs 3*a* are positioned in engagement with a portion of the support adjacent to one edge of the aperture *b* and one (the upper as shown in Fig. 2) of the lugs 4*a* are positioned in engagement with a portion of the support adjacent to an opposite edge of the aperture *b* to that engaged by the lugs 3*a*. The head 1 is of greater dimension than that of the aperture and will extend over three edges thereof to substantially conceal it. The depending flange 5 on the head is adapted to engage over and clamp a member 6 to the support. As shown the member 6 comprises part of a rubber sealing strip and teeth or serrations 7 formed on the free edge of the flange 5 are adapted to dig into the rubber to securely clamp the member in position.

It will be noted that the fastener device is secured in place by portions of the flange 2 extending over and engaging with portions on one face of the support on each side of the aperture, and the lugs 3*a*, 4*a* which engage portions of the opposite face of the support. The head 1 serves to clamp the member 6 to the support and also serves to conceal the aperture *b*.

The provision of the spaced lugs 4*a* enables the fastener to be used with supporting panels of differing thickness.

The fastener device is particularly adapted for securing a rubber or like sealing strip to structures such as the door frame or other part of a vehicle body.

It will be understood that the lugs or teeth 4*a*, and the lugs 3*a* may be formed with sloping side faces to facilitate the passage of the legs into the aperture *b*.

The fastener is preferably made from a single blank of sheet metal bent to form the head and U-shaped attaching legs, the lugs 3*a*, 4*a* and flanges 2, 5 being formed by bending portions of the head and lugs.

In the case where a sealing strip is to be secured it will be understood that a series of fasteners will be provided spaced longitudinally of the strip and adapted to be inserted in a corresponding number of apertures in the support.

I claim:

A fastener device of sheet metal for attaching a member to an apertured support comprising a substantially flat head provided with a pair of downwardly extending flanges disposed on opposite edges, an U-shaped stud portion extending substantially normal to the head and including a pair of opposed relatively moveable sides connected by a bight portion and adapted to be inserted into an aperture in a support, one of said sides being integrally connected opposite the bight portion centrally with one of said flanges, the other side having a free end extending to a position adjacent to but spaced from the under face of the head and between said flanges, said other side having series of spaced prongs extending from its side edges, the side edges of said prongs adjacent the head being disposed substantially parallel to said head to provide means for engaging one side of the apertured support through which the stud may be extended, the other free edges of the prongs providing sloping camming surfaces for facilitating the insertion of the stud into an aperture of the supporting panel, said one side having at least one laterally extending projection adjacent the head flange providing a side edge substantially parallel to the head for engaging the under face of the supporting panel, the other free edge of the projection providing a sloping camming surface to facilitate insertion of the stud through the aperture in the panel, the other of said flanges when the stud portion is engaged in the aperture of a supporting panel providing means for clamping a member to a face of the supporting panel.

References Cited in the file of this patent

UNITED STATES PATENTS

| 2,178,719 | Cotter | Nov. 7, 1939 |
| 2,194,855 | Jones | Mar. 26, 1940 |
| 2,198,186 | Tinnerman | Apr. 23, 1940 |

FOREIGN PATENTS

| 684,107 | Great Britain | Dec. 10, 1952 |
| 956,474 | France | Aug. 8, 1949 |